United States Patent [19]

Cubranich et al.

[11] Patent Number: 5,051,946
[45] Date of Patent: Sep. 24, 1991

[54] INTEGRATED SCANNABLE ROTATIONAL PRIORITY NETWORK APPARATUS

[75] Inventors: Ladislaw D. Cubranich, Lansdale; Inder Singh, Audubon, both of Pa.

[73] Assignee: Unisys Corporation, Blue Bell, Pa.

[21] Appl. No.: 244,189

[22] Filed: Sep. 13, 1988

Related U.S. Application Data

[63] Continuation-in-part of Ser. No. 882,118, Jul. 3, 1986.

[51] Int. Cl.$^5$ ........................................... G06F 13/368
[52] U.S. Cl. ................................ 364/900; 364/941.2; 364/941.6; 364/935.43
[58] Field of Search ... 364/200 MS File, 900 MS File

[56] References Cited

U.S. PATENT DOCUMENTS

| | | | |
|---|---|---|---|
| 3,983,540 | 9/1976 | Keller et al. | 364/200 |
| 4,009,470 | 2/1977 | Danilenko et al. | 364/200 |
| 4,232,294 | 11/1980 | Burke et al. | 364/200 |
| 4,320,457 | 3/1982 | Tanikawa | 364/200 |
| 4,332,011 | 5/1982 | Epstein et al. | 364/200 |
| 4,458,314 | 7/1984 | Grimes | 364/200 |
| 4,554,628 | 11/1985 | Bell | 364/200 |
| 4,558,412 | 12/1985 | Inoshita et al. | 364/200 |
| 4,760,515 | 7/1988 | Malmquist et al. | 364/200 |
| 4,766,536 | 8/1988 | Wilson, Jr. et al. | 364/200 |
| 4,787,033 | 11/1988 | Bomba et al. | 364/200 |
| 4,821,177 | 4/1989 | Koegel et al. | 364/200 |

Primary Examiner—Gareth D. Shaw
Assistant Examiner—Maria Napiorkowski
Attorney, Agent, or Firm—John B. Sowell; Mark T. Starr; Thomas J. Scott

[57] ABSTRACT

An integrated priority network is provided for a bus architecture computing system of the type employing a M-Bus connected to a plurality of functional elements. Each functional element has its own integrated priority resolution network (IPRN) coupled to said M-Bus for activating its own unique individual priority request and for receiving all individual priority requests from all other functional elements. Each integrated priority resolution network unit is provided with a rotational priority circuit and a preemptive priority circuit connected in parallel and operable independently to produce a request granted signal. Logic circuits in each rotational priority circuit determine when an IPRN unit will be granted its priority request for access to said M-Bus and will block future requests from being activated to its IPRN unit until the other IPRN unit values in the rotational priority register of the rotational priority circuit have been granted access to said M-Bus. The IPRN unit is also scannable to determine its rotational priority status.

10 Claims, 2 Drawing Sheets

INTEGRATED SCANNABLE ROTATIONAL PRIORITY NETWORK APPARATUS

BACKGROUND OF THE INVENTION

1. Related Applications

This application is a continuation in part of application Ser. No. 06/882,118 filed July 3, 1986 for an "INTEGRATED SCANNABLE ROTATIONAL PRIORITY NETWORK APPARATUS", now abandoned.

2. Field of the Invention

The present invention relates to priority systems of the type employed in data processing systems. More particularly, the present invention relates to a priority system which employs a primary pre-emptive priority system combined with and operated in parallel with a secondary integrated rotational priority system which is dynamically programmable and easily scannable.

3. Description of the Prior Art

Priority networks or arbitration networks are employed in multiprocessing systems where certain functional units such as instruction processors, input/output processors or controllers and channel controllers have under their supervision a plurality of peripheral units such as disk drives, tape drives and printers as well as the numerous I/0 channels for a bus architectural system. Large bus architectural systems usually employ more than one input/output processor (I/OP) and quite often employ a plurality of channel controllers which supervise or control peripheral units and channels of the same order or priority.

Heretofore, priority networks were known and operated to prevent different functional requesting units from being denied access to a common system bus or data bus because its assigned priority level and/or priority request was never of a high enough level of priority to seize or gain access to the system bus.

Heretofore, priority networks or arbitration networks have been generally classified in U.S. Class 364, subclass 200, 200 M.S. and 900 M.S. Priority networks have been employed to determine when one of a plurality of multiprocessors shall have priority access to a shared memory. The priorities can be resolved on the basis of fixed priority or on the basis of a modified priority. Modified priorities have been resolved on the basis of waiting time accumulated in a history file or on a rotational basis where the rotational network honors each of the functional units in a rotational sequence only once before rotating the priority to the next functional unit which may have been assigned a lower priority but is of equal importance so that no functional element is serviced twice before another functional element of the same order of importance in the rotational network is honored at least once.

The present invention is an improvement over the priority network shown and described in U.S. Pat. No. 4,009,470 which is assigned to the assignee (successor of Sperry-Rand Corporation) as the present invention. This patent describes and shows a priority system for multiprocessors sharing an associative memory unit. The priority system has several priority modes of operation, however, the primary mode of operation arranged the requesting functional elements into groups of 8 in descending order of priority which were honored on a preemptive or numerically descending order basis from highest order to lowest order. In the second mode of operation, pairs of adjacent ordered group priorities were reversed or rotated so that the pair in the group effectively had equal priority. When pair of requestors R5 and R4 where first honored would assign access to memory to requestor R5. Having once honored requestor R5, the rotational priority circuit would treat requestor R5 as the lower priority than requestor R4 forcing requestor R4 to be honored even when requestor R5 simultaneously was seeking access to the associative memory unit.

While this priority network provided a substantial improvement over a purely pre-emptive priority system, it did not resolve the problem that arises when more than two requestors of equal importance are assigned pre-emptive priorities. Under these conditions a plurality of requestors of equal importance are assigned pre-emptive priorities of lower order than others.

Multiprocessing systems are presently being sold which have six or more processors in a multiprocessor configuration. Customers ordering such processors may desire a much smaller system with only two multiprocessors in a multiprocessing system. At some future date, the customer may desire to expand the system and fully utilize the maximum efficiency available for the new multiprocessor configuration without incurring hardware modification cost. Depending on the use to which a multiprocessor system will be employed, different priorities need to be assigned to the functional units of the multiprocessing system when employed for different customers and for their different uses. Accordingly, it would be desirable to provide a scannable and programmable priority network which integrates the features of a pre-emptive priority network system and a rotational priority network system without hardware modifications or shutting down the system.

SUMMARY OF THE INVENTION

It is a primary object of the present invention to provide a novel integrated programmable priority network.

It is another primary object of the present invention to provide a priority network system having a preemptive priority network and a rotational priority network which operate in parallel simultaneously.

It is another object of the present invention to provide an integrated distributive priority resolution network comprising a programmable rotational priority network system.

It is another object of the present invention to provide an integrated priority network having a rotational priority register which permits equal access to the main bus system for all of the priorities of functional equipment stored in the programmable rotational priority register.

It is another object of the present invention to provide a distributed priority resolution network for a high speed main bus architecture computing system which resolves priorities of all functional units attached to the main bus in a minimum of time.

It is another object of the present invention to provide a novel rotational priority network that is sampled every bus cycle time when requests are resolved to prevent lock outs and overflows.

It is a general object of the present invention to provide a novel rotational priority network which is programmable to provide flexibility in activating and deactivating the rotational priority levels to accommodate the multiprocessor system needs without interrupting the system operations.

It is another general object of the present invention to provide an integrated priority network which permits each functional unit to be programmed as a preemptive unit or as a rotational unit in conformance with a multiprocessor system requirements.

It is a general object of the present invention to provide a programmable priority network in which each functional unit processes its own request for access to the main bus in a very short time so as to avoid interference with the maximum transfer of data in the shortest possible time.

According to these and other objects of the present invention there is provided an integrated priority network for a bus architecture computing system of the type employing a M-Bus connected to a plurality of functional elements each having their own integrated priority resolution network for resolving their own priority request. Each of the priority networks in each of the functional units is provided with transmitting means for applying its own unique priority request or code signal to the M-Bus and is further provided with means for receiving all of the unique priority requests provided to the M-Bus. Each priority resolution network is provided with a preemptive priority circuit and a rotational priority circuit which operate in parallel and honor the highest priority request raised on the M-Bus unless the request was raised by a functional unit whose priority is stored in the rotational priority register of the rotational priority circuit. In this case the rotational priority requests are honored in the rotational sequence in which they are stored in the rotational priority register before twice honoring the highest priority stored in the rotational priority register.

DESCRIPTION OF THE PREFERRED EMBODIMENTS

Figure 1:
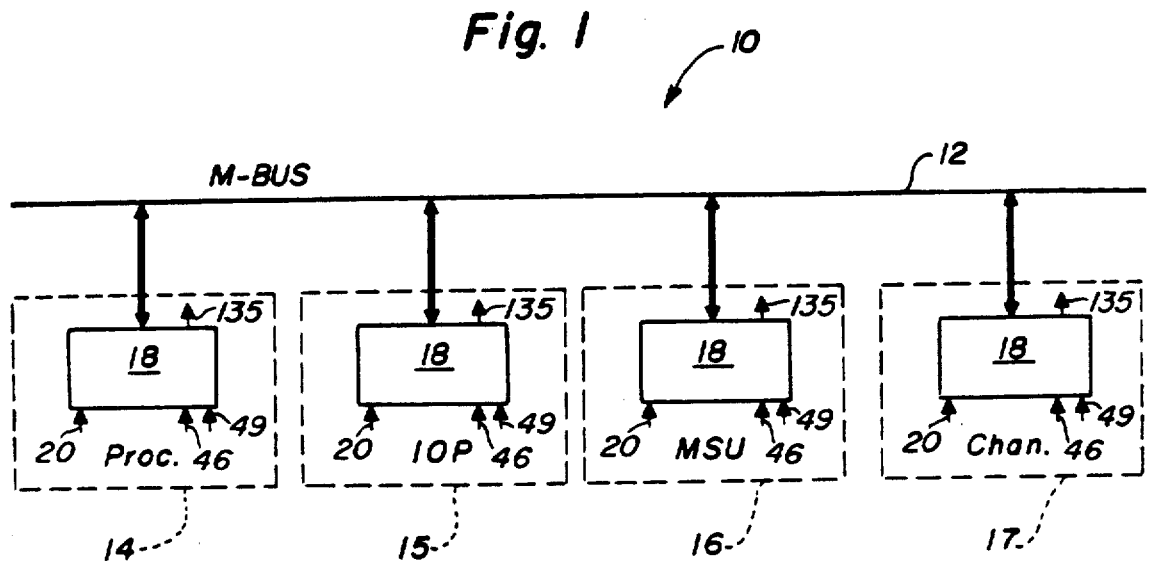
FIG. 1 is a block diagram of a plurality of functional elements attached to a main system bus (M-Bus) of the type in which the present invention is utilized.

Refer now to FIG. 1 showing a block diagram of the environment in which the present invention is utilized. Multiprocessor system 10 is representative of a bus architecture processing system which is provided with a main input/output bus (M-Bus I/O system) 12. Each of the functional elements shown may be duplicated in a multiprocessor system including a central processor 14, an I/O processor 15, a main storage unit 16 and a channel controller 17, all of which transmit data to other functional elements and receive information from other functional elements via the M-Bus 12. In order for any of the functional elements 14–17 to gain access to the M-Bus 12, they must request access and have that access acknowledged while other functional units which may have also requested access are blocked from having access to the M-Bus 12. The management of request for access to the M-Bus (hereinafter request) raised by the different functional units at their individual input 46 to the integrated scannable rotational priority networks (ISRPN) 18 is conducted simultaneously and in parallel. Network unit 18 integrates a preemptive priority network into one distributed priority resolution network and allows each network unit 18 to operate independently and in parallel during the first phase of a 10 phase M-Bus cycle time of eighty nano seconds. Only one network unit 18 returns a request granted signal to its functional unit to permit only one functional unit access to the M-Bus during the remaining portion of the machine's cycle time and all other networks 18 deny the requests of their associative functional elements which are also active.

In the preferred mode of operation, the request granted signal raised on line 135 instructs the functional element to transmit its data on M-Bus 12. The data applied to the M-Bus 12 contains information bits identifying the transmitting element and the receiving element. Although all of the elements on the M-Bus receive the data, only the element identified by the designation bits utilizes the data being transmitted. At the end of a cycle or predetermined number of machine cycles, the transmitting element drops its priority disable signal on line 49 signifying that the transmission of data is complete so that the networks 18 may again allow all of the requests for access to the M-Bus to be raised and assign access to the highest priority request being raised on input line 82 of FIG. 2 or to a priority of equal order importance stored in the rotational priority network to be described hereinafter in greater detail. At the next sequential bus time for resolving request, all networks 18 are sampled and the network 18 having the highest priority will have its request granted. If the network unit 18 having the highest priority is a network having its priority stored in an active rotational priority network, one of the rotational units stored in the rotational priority network will have its request granted in the same manner as a preemptive request would be granted.

Figure 2:
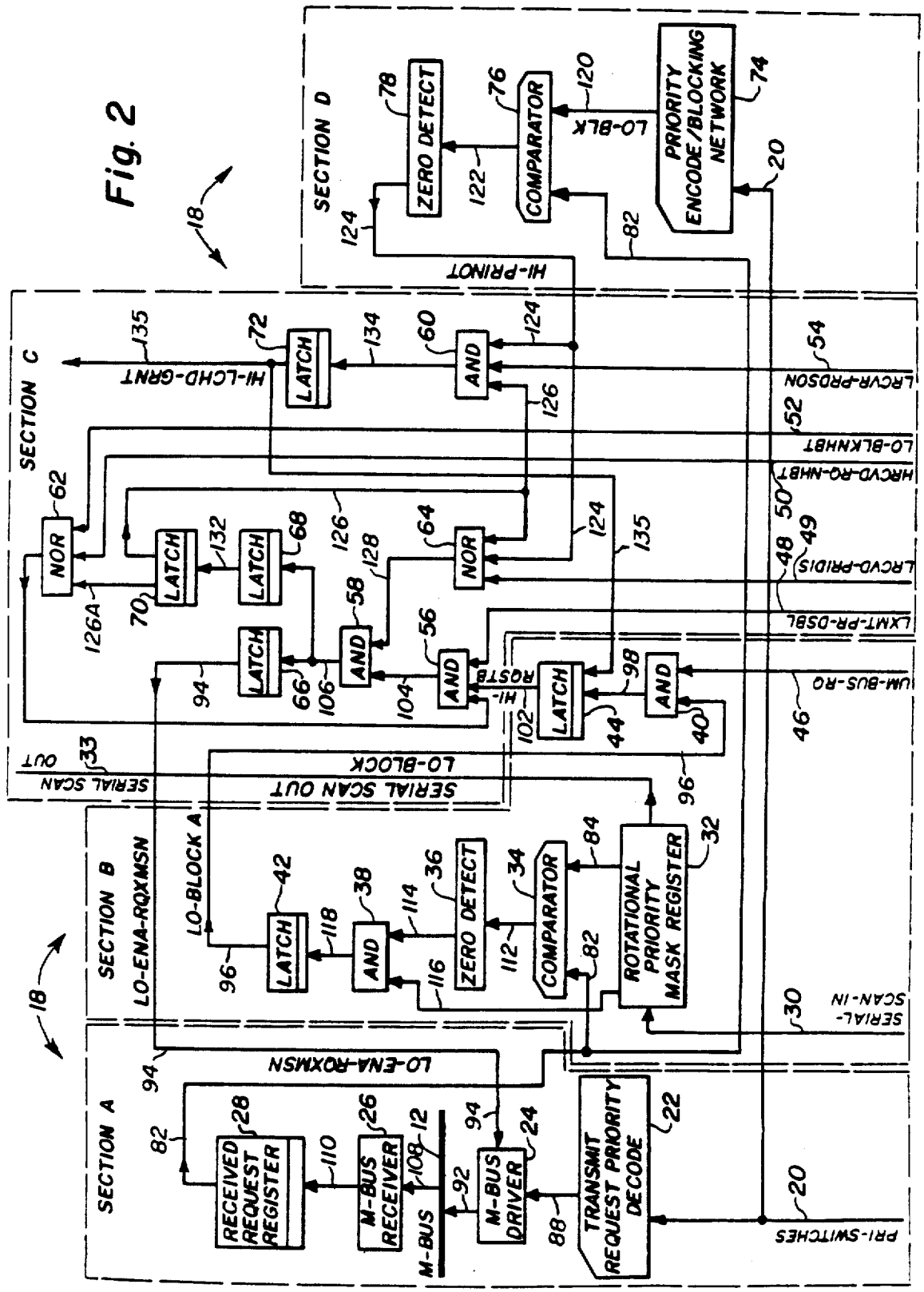
FIG. 2 is a detail block diagram of one of the integrated scannable rotational priority networks . incorporated into each of the functional elements of the type shown in FIG. 1.

Refer now to FIG. 2 showing a detailed block diagram of one of the integrated scannable rotational priority networks (ISRPN) units 18 which are incorporated into each of the functional elements, 14 to 17 shown in FIG. 1. It will be understood that a plurality of functional units such as I/O processors 15 and channel controller 17 as employed in a multiprocessor system. Each of the functional units will be provided with one of the priority networks 18. FIG. 2 is divided into four sectional units outlined in phantom lines and labeled sections A to D.

Section A comprises the M-Bus 12 interface logic and the transmitting and receiving request paths. The priority for each of the units 18 is set at its priority switches (not shown) which provide coded priority signals on line 20 that may be dynamically changed from a location remote to the circuit.

Section B comprises the rotational priority logic and receives the unit M-Bus request on line 46 which may be blocked by the rotational priority logic if the functional unit raising the request has its priority stored in rotational priority register 32. Serial scan in line 30 and serial scan out line 33 are coupled to the rotational priority register 32 and provide means for dynamically setting the priorities in register 32 and for scanning out the priorities set in register 32 respectively. The request raised on lines 46 may be raised at any time during a bus or machine cycle, but are only scanned at the start of a machine or bus cycle to determine which of the units 18 will raise its request granted signal and be provided access to the M-Bus 12 for the functional unit associated with the priority network unit 18.

Section C comprises the integrated logic which receives a request signal from Section B and resolves the priorities stored in the rotational priority register 32 and the pre-emptive priority circuit stored in Section D. The logic in this section initiates the enable signal on line 94 to the M-Bus driver 24 and raises the request granted signal on line 135 when the unit 18 logically determines that its request for access to the M-Bus shall be granted.

Section D comprises the pre-emptive priority logic circuits. Every unit 18 has a designated priority which is set on line 20 and which indicates its own pre-emptive priority at the input to blocking network 74. Network 74 contains all of the designated priorities for all of the units 18 associated with the functional elements of the system 10. All of the requests being raised on the M-Bus at the cycle time being scanned are presented on input line 82 and if any of the priorities of all of the units 18 is higher than the priority designated for the individual unit 18 on input line 20, the prevent logic of Section D will block the request grant signal for the individual unit after having logically determined that a higher order priority request is active.

A specific example will be explained in detail concerning one of the units 18 shown in detail in FIG. 2. Assume that the priority signal raised on line 20 is one of the priorities assigned to one of a plurality of I/O processors 15 and that a plurality of I/O processors 25 each have their priorities stored in each of the rotational priority registers 32 so that their request will be granted on a rotational priority basis to avoid conflicts between I/O processors of equal importance and/or priority level. The dynamic priority switches (not shown) raise a coded signal on priority switch line 20 which is applied to the priority decoder 22. Decoder 22 generates a unique digital signal on its output line 88 which indicates the unique priority of the unit 18 for which the switches were set. Only one unit 18 may have this unique priority level. The priority signal on line 88 is applied to M-Bus driver 24 which generates an output request signal on line 92 if an enable signal is present at the enable input on line 94. The low enable signal on line 94 starts as a unit request input on line 46 which was raised by the functional unit associated with its unit 18. The request on line 46 is applied to AND gate 40 and when not blocked by a second input signal on line 96 produces the request signal on line 98 that is applied to latch 44 which holds the input request for the requesting unit 18.

A 16 bit rotational priority mask register 32 is . adapted to receive rotational priorities or second order priorities via serial scan input line 30. Once the secondary rotational priorities are serially scanned into register 32, they remain until reprogrammed. Not all of the units 18 are assigned a rotational priority, but units like units 18 for I/O processors will all have their priorities stored in the rotational priority registers 32 of each of the units 18 associated with each of the I/O processors for which rotational priority will be provided. For each of the units 18 which have their priority loaded in each of the mask registers 32 there is an active output on line 84 to comparator 34. Initially, AND gate 56 receives the request signal initiated at line 46 from latch 44 on line 102. Normally the other two inputs to AND gate 56 are high and active as will be explained hereinafter, thus, a high output is produced from AND gate 56 on line 104 which is applied to AND gate 58 whose second input on line 128 is normally high. The high output signal on line 106 from AND gate 58 sets latch 66 and produces a low request enable signal on line 94. The low request enable signal on line 94 is applied to the M-Bus driver 24 which produces a request output signal on line 92 that identifies the unit 18 and its priority request. All units 18 which have request inputs on their lines 46 operate in a similar manner to produce request signals on their lines 92 which are applied to the M-Bus 12. Line 108 comprises a request line for each of the functional units of the system 10. In the preferred embodiment of the present invention there are 16 request lines 108 connecting M-Bus 12 and M-Bus receiver 26. All of the active requests are presented on line 110 from receiver 26 to the request register 28 that holds all of the request and produces a plurality of active request on output line 82 which connects to the input of comparator 34 in the rotational priority circuits and to the input to comparator 76 of the pre-emptive priority circuits. The request signals on line 92 identify all units 18 that have raised initial request on line 98 and 46. The received M-Bus request signals stored in register 28 generate a continuous output on line 82 at comparator 34 which will cause an output signal to be generated on line 112 when any of the priorities set in register 32 also appear as an input on line 82.

Assuming that a rotational priority is present on both lines 82 and 84, an output signal on line 114 will be raised at the output of zero detect circuit 36 indicating that a rotational request is pending priority resolution. The output signal on line 114 is applied to AND gate 38 along with a validating enable signal on line 116 from rotational priority register 32. The resulting output on line 118 is applied to latch 42. If a rotational request is pending priority resolution and also this unit 18 has a rotational priority request being raised on line 46 then the LOW-BLOCK signal is produced on line 96 at each unit 18 which has a rotational priority stored in its register 32. The blocking signal on line 96 is applied to the input of AND gate 40 where the initial request for this unit 18 was raised. The low-blocking signal on line 96 at AND gate 40 now prevents AND gate 40 for the unit 18 which raised the request from raising any additional request on line 98 until all other rotational requests outstanding in their holding latches 44 have been serviced. The blocking signal on line 96 for this unit 18 will not be removed until other units 18 which have their rotational priority stored in register 32 and their latches 66 have their request granted. The unit raising this unresolved request has already raised a request signal at register 28 and on output line 82 to the input of comparator 76. The second input to comparator 76 on line 120 from priority networks 74 are low-blocking signals which block the unit request for the unit identified as having generated the original request on its input line 46 and also blocks all lower priority unit requests. Stated differently, the comparator 76 will only generate an active output signal on line 122 if a request on line 82 includes units 18 having higher priority requests than the unit raising the request on line 46 for this unit. If there is an active higher request on line 82 than is raised by this unit 18, then the signal on line 122 becomes a blocking signal from a higher priority unit 18 which is applied to zero detect gate 78. The blocking signal on output line 124 is normally low except when no other priority is higher than the priority for this unit 18. Assume that the present unit 18 detects that no other unit 18 has raised a request having a higher priority, then a high priority NOT signal (not blocking) on line 124 is raised which is applied to AND gate 60 and to NOR gate 64. The unit priority disable signal on line 49 to NOR gate 64 is ordinarily high unless it has been disabled by the functional unit raising the request on line 46 for other reasons. The aforementioned high output signal on line 106 which was applied to latch 66 is also applied to latch 68 to produce a high output signal on line 132 which is applied to latch 70 to produce a high output signal on line 126 which is also applied to NOR gate 64 along with the NOT high priority signal on line 124 and the ordinarily high signal on line 49 which generates a low active output signal on line 128. The low active signal on line 128 blocks the AND gate 58 and the request signal on line 104 from AND gate 56. The blocking or low signal on line 106 now resets latch 66 and pulls down the enable signal on line 94 which is applied to the M-Bus driver 24, thus, removing this unit's request signal and resetting latch 68. The reset output of latch 68 on line 132 resets latch 70 and drives the previously high signal from latch 70 on line 126 and 126A low. When inputs 126A, 50 and 52 are all low the output of NOR gate 62 is high as an input to AND gate 56 as previously assumed.

It was previously explained that this unit 18 has a rotational priority and is the rotational priority unit having its request granted, thus, the request on line 92 to M-Bus 12 is removed so that this unit 18 which will be shown to have its request granted, cannot raise an additional request until all of the units 18 having their priorities stored in rotational priority register 32 have had their request granted. The high signal on line 124 is required to complete the grant of a request and is being applied to AND gate 60 at the same time the signal on line 126 is high. The signal on line 54 to AND gate 60 is normally high which causes a high output signal on line 134 that is applied to latch 72 to hold the high signal. The high output signal from latch 72 on line 135 indicates that the unit 18 which raised the initial request on line 46 has its request granted and all other units 18 have their request granted signals blocked until the next machine cycle.

The signals to the same unit 18 from its functional element on lines 48 to 52 ordinarily apply to special functions and do not interfere with the operation of the pre-emptive priority circuits. The special signals from other units 18 and elements being applied to their lines 49, 50 and 54 also apply to special functions programmed into other elements and do not interfere with the normal functions and operations of the rotational priority register 32 or to the pre-emptive priority resolution network 74.

The foregoing explains the operation of one of the network units 18, which had its priority stored in the rotational priority register 32 and had its request granted as a signal on line 135 at the expense of having further request on line 46 to the unit blocked at AND gate 40. When the request grant is raised on line 135, the signal is employed to reset latch 44 indicating that this unit 18's request has been serviced, and as explained above, cannot be set by a request on line 46 until all other pending rotational requests have been serviced. Further, the priority request is disabled on line 92 by removal of the enable signal on line 94 to M-Bus driver 24. Effectively, the unit receiving the request which has a priority stored in the rotational priority register 32 cannot raise an additional request in its priority network 18 until the request of all other units 18 having a rotational priority stored in register 32 are resolved by having their request granted on their output lines 135.

The last unit 18 which has its rotational priority stored in register 32 generates a signal on line 84 that is compared with its request on line 82 in comparator 34. This results in raising a low-blocking signal on line 96 which is applied to AND gate 40. After this last unit 18 has its request blocked, the next following cycle which scans all of the unit 18 request will raise a high signal on all of the lines 96, thus, unblocking AND gate 40 at all of the units 18 so that the newer requests arising on unit request lines 46 are again processed in the manner described hereinbefore.

Having explained the operation of one of the priority units 18, it will be understood that each functional unit has its own integrated scannable rotational priority network unit 18. Every unit 18 will be programmed at its pre-emptive priority network 74 with the priority of all of the units in the system 10 and will be programmed with its own priority at its programmable switches (not shown) which connects to the unit 18 through line 20. Further, the rotational priority registers 32 are programmable through serial scan in line 30 and readable at any time through serial scan out line 33. In a preferred mode of operation a central processor 14 would not have a rotational priority programmed in register 32 and is ignored or bypasses the rotational priority sequence. Similarly, the main storage unit 16 would not have its unit 18 programmed with a rotational priority and the priority register 32 and the rotational priority sequence would be bypassed. These two functional elements would have their request processed by the pre-emptive priority network 74 and if their priority was the highest priority being examined during a machine cycle would produce a high active signal on line 124 at the input of AND gate 60 and produce a high active signal on line 134 at the input of latch 72 which raises the high active grant signal on 135 for the unit 18 having the highest priority.

For small systems 10 which employ a single signal channel controller 17 or a signal input/output processor controller 15, it would not be necessary to initially employ the rotational priority register 32. All of the priorities could be resolved by the pre-emptive priority network 74. However, as the system became larger, and additional channel controllers 17 and IOPs 15 are added to the system their priorities can be set or modified at the priority switches connected to input line 20. The priorities may be arranged in the preferred order of sequence in rotational priority registers 32 by employing the serial scan in line 30 so that the new expanded system 10 would operate with maximum efficiency without overflow or lock outs The novel rotational priority mask register 32 which operates in parallel with the pre-emptive priority network 74 does not interfere with the normal operation of the pre-emptive priority network 74.

Even after the rotational priority register 32 is programmed and the priority request are being resolved at the start of a machine cycle any higher priority than that stored in the rotational priority registers effectively bypasses the rotational priority sequence and does not relinquish control of the M-Bus 12 until all the higher priority requests are satisfied Once the higher priority requests are satisfied by the individual units 18, then the rotational priority request stored in registers 32 of the individual units 18 become effective and can raise their individual request grant signals on their lines 135 in rotational sequence until all of the rotational priorities stored in registers 32 are satisfied and the blocking signal on line 96 to AND gate 40 is again removed so that the rotational sequence can repeat itself.

At the start of each machine cycle or bus cycle, all requests are normally being applied to the M-Bus by all of the requestors on their unit request lines 46, 98 and are examined in the individual units 18 which will award priority to the highest priority request signal being applied to the units 18. After request is granted to one of the units 18, the functional element applies its data to be transmitted to the M-Bus 12 The data contains information bits identifying both the transmitting equipment and the receiving (destination) equipment All functional elements on M-Bus 12 receive the data and information bits, but only the receiving equipment identified by the destination bits in the data being transmitted utilizes the information and all other functional elements receiving the data ignore the data received.

Having explained a preferred embodiment of the present invention, it will be appreciated that the rotational priority circuits operate independently and in parallel with the pre-emptive priority circuits. Further, the rotational priority logic senses whether the rotational priority circuits will be activated and when activated raise a blocking signal at the request input of the unit 18 which will have its request granted and will achieve access to the . M-Bus. Each functional unit in the system 10 has an identical priority network 18. Each of the priority network units 18 performs a priority determination based upon the programmable unique priority on input line 20. Each of the priority units 18 has a different priority for its unit 18, thus, only one unit 18 is capable of granting request for access to the M-Bus 12.

What is claimed is:

1. An integrated priority network for a bus architecture computing system, comprising:
    a main M-Bus,
    a plurality of functional elements connected to said M-Bus for transmitting data to and for receiving data from said M-Bus,
    means for raising a priority request for access to said M-Bus in each said functional element,
    a plurality of integrated priority resolution network (IPRN) units, one said unit being associated with each functional element and being coupled to receive priority requests from the functional elements on the M-Bus and for generating a request granted signal to its associated functional element,
    each said network unit comprising a rotational priority circuit and a pre-emptive priority circuit connected in parallel and operable to receive said priority requests independently in an integrated priority network so that either circuit may generate said request granted signal, and
    logic means in each said rotational priority circuit of said network units for determining when its associated IPRN unit will grant its associated functional element's request for access to said M-Bus and if granted for blocking future requests by its associated function element from being transmitted to said M-Bus until all other pending priority requests in the rotational priority circuit are granted.

2. An integrated priority network as set forth in claim 1 wherein each of said pre-emptive priority circuits include logic means having priorities assigned to all functional elements for determining when any of said priority requests for access for said M-Bus from other IPRN units have a higher priority than the priority assigned to its own IPRN unit, and
    means coupled to said priority circuits for blocking a request for a grant to access said M-Bus from IPRN units having a lower priority than the IPRN unit having the highest priority.

3. An integrated priority network as set forth in claim 1 which further includes programmable switch means connected to said priority circuits for programming a priority for each IPRN unit.

4. An integrated priority network as set forth in claim 3 which further includes scan input means coupled to said rotational priority circuits for programming priority values in said rotational priority circuits.

5. An integrated priority network as set forth in claim 4 wherein said rotational priority circuits in each IPRN unit include a rotational priority register for receiving and storing rotational priority values from said scan input means.

6. An integrated priority network as set forth in claim 5 which further includes scan output means coupled to each said rotational priority register for providing signals indicative of the contents of each said rotational priority register.

7. An integrated priority network as set forth in claim 5 which further includes a comparator coupled to the output of each said rotational priority register in each IPRN unit for receiving signals indicative of the priorities stored therein, and
    said comparator being further coupled to said M-Bus for receiving all of the priority requests being transmitted on said M-Bus to provide an output signal indicative of a rotational priority request being activated.

8. An integrated priority network as set forth in claim 7 which further includes an AND gate coupled to an output of each said comparator and having an enabling input from said rotational priority register of the same IPRN unit which is indicative of the priority of said IPRN unit, and
    the active output of each said AND gate of each IPRN unit providing a blocking signal to block any further request of said IPRN unit all other rotational priority requests have been satisfied.

9. An integrated priority network for a bus architecture computing system, comprising:
    a main M-Bus,
    a plurality of functional elements connected to said M-Bus for transmitting data to and receiving data from said M-Bus, each of said functional elements having a predetermined unique priority for access to said M-Bus,
    integrated priority resolution network units, one for each functional element being coupled to said M-Bus and to said functional elements for resolving a request for access to said M-Bus raised by its associated functional element,
    each said integrated priority resolution network unit having a pre-emptive priority circuit connected in parallel with, and operable independently of, a rotational priority circuit for receiving priority requests,
    said priority circuits being connected to means for generating a request granted signal by either priority circuit,
    means for setting priority values coupled to said priority circuits for setting a plurality of said unique priorities in each of the rotational priority circuits whose priorities will be subject to rotational priority resolution, and means coupled to the output of said rotational priority circuits for blocking a request for access to said M-Bus which is activated by a functional unit and granted as having its unique priority stored in said rotational priority circuits until after all other functional elements have their requests for access to said M-Bus granted.

10. An integrated priority network as set forth in claim 9 which further includes gating means in each rotational priority circuit for removing said blocking signals at said means for blocking request for access to said M-Bus after all rotational priority requests have been once granted.

* * * * *